(12) United States Patent
Harriman, II et al.

(10) Patent No.: US 11,685,258 B1
(45) Date of Patent: Jun. 27, 2023

(54) SYSTEM AND METHOD TO REDUCE TRANSFER CLUTCH OVERHEATING

(71) Applicant: FORD GLOBAL TECHNOLOGIES, LLC, Dearborn, MI (US)

(72) Inventors: Douglas Harriman, II, West Bloomfield, MI (US); Michael Frey, Farmington Hills, MI (US); Filip Tomik, Milford, MI (US); Bradley D. Riedle, Northville, MI (US); Peter Chagnon, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/849,896

(22) Filed: Jun. 27, 2022

(51) Int. Cl.
  *B60K 23/08* (2006.01)
  *B60K 17/35* (2006.01)
  *F16D 48/06* (2006.01)

(52) U.S. Cl.
  CPC ...... *B60K 17/3505* (2013.01); *B60K 23/0808* (2013.01); *F16D 48/06* (2013.01); *B60W 2510/0275* (2013.01); *B60W 2510/0291* (2013.01); *F16D 2500/30404* (2013.01); *F16D 2500/30406* (2013.01)

(58) Field of Classification Search
  CPC . B60K 17/3505; B60K 23/0808; F16D 48/06; F16D 2500/30404; F16D 2500/30406; B60W 2510/0275; B60W 2510/0291
  See application file for complete search history.

(56) References Cited

U.S. PATENT DOCUMENTS

| 6,086,514 | A | * | 7/2000 | Jones | F16D 48/066 477/74 |
|---|---|---|---|---|---|
| 6,568,256 | B1 | | 5/2003 | Lee | |
| 6,834,225 | B1 | | 12/2004 | Jiang et al. | |
| 7,630,812 | B2 | | 12/2009 | Jiang et al. | |
| 8,234,050 | B2 | | 7/2012 | Burns et al. | |
| 9,718,355 | B2 | * | 8/2017 | Osborn | F16H 48/05 |
| 9,919,709 | B2 | | 3/2018 | Percy | |
| 10,036,436 | B2 | | 7/2018 | Cho | |
| 10,501,082 | B2 | | 12/2019 | Garcia et al. | |
| 2010/0094519 | A1 | * | 4/2010 | Quehenberger | B60K 17/35 701/69 |

FOREIGN PATENT DOCUMENTS

DE    102015205884 A1 * 10/2016

* cited by examiner

*Primary Examiner* — Justin Holmes
(74) *Attorney, Agent, or Firm* — Vincent Mastrogiacomo; Brooks Kushman P.C.

(57) ABSTRACT

A system and method for controlling a torque transfer clutch of a vehicle. A first data source indicates if the clutch is in AWD or 4×4 mode. An integrator system monitors energy transferred across the clutch. A temperature data source measures or calculates the clutch temperature. In a first case, the integrator accumulates data of the energy across the clutch during a monitoring period that is compared to a maximum accumulated energy value and initiates a powertrain torque dependent transfer point learn routine. In a second case, the controller responds to energy accumulator cycle data in a single monitoring cycle that is compared to a maximum cycle data value. In a third case, the controller responds to clutch temperature data and compares the temperature data to a maximum temperature value. The second and third cases initiate a non-powertrain torque dependent transfer point learn routine.

20 Claims, 2 Drawing Sheets

SYSTEM AND METHOD TO REDUCE TRANSFER CLUTCH OVERHEATING

TECHNICAL FIELD

This disclosure relates to controlling transfer case operation in four wheel drive vehicles.

BACKGROUND

Active All Wheel Drive (AWD) or Four-by-Four (4×4) systems are provided in four wheel drive vehicles to transfer torque from a first axle that propels the vehicle in a Two Wheel Drive (2WD) mode to a second axle when operating in a Four Wheel Drive (FWD) mode. Torque transfer may be accomplished by an actuation system that includes a torque transfer clutch.

Previous product implementations performed a torque transfer point relearn at the beginning of each drive cycle.

Off-road drive cycles that may be attempted before the torque transfer clutch is fully broken-in can result in the torque transfer home position shifting during the drive cycle resulting in the torque transfer clutch not delivering the requested output torque. If the transfer clutch slips excessively due to the transfer clutch torque transfer home position ("kisspoint," "KP," or "transfer clutch torque transfer home position") shifting during the drive cycle, the transfer clutch may overheat. If the torque transfer clutch overheats, the controller may cause a thermal shutdown to protect the torque transfer clutch hardware. 4×4 enthusiasts expect that the transfer case will not shut down due to aggressive or off-road drive cycles.

This disclosure is directed to solving the above problems and other problems as summarized below.

SUMMARY

According to one aspect of the system disclosed, a system is disclosed for controlling a torque transfer clutch of a four wheel drive vehicle. The system includes inputs from a first data input source that indicates if the torque transfer clutch is in a four wheel drive mode, an energy integrator system monitors the energy transferred across a transfer clutch, and a temperature sensor that measures a transfer clutch temperature or a software tool that estimates the temperature based on detected slippage. A controller controls the system in one of three modes. In a first case, the controller responds to energy integrator accumulated data as to the energy across the torque transfer clutch during a monitoring period and compares the accumulated data to a maximum accumulated energy value by initiating a powertrain torque dependent transfer point learn routine. In a second case, the controller responds to energy accumulator cycle data as to the energy across the torque transfer clutch in a single monitoring cycle and compares the cycle data to a maximum cycle data value to initiate a non-powertrain torque dependent transfer point learn routine. In a third case, the controller responds to temperature data as to a temperature of the torque transfer clutch and compares the temperature data to a maximum temperature value to initiate a non-powertrain torque dependent transfer point learn routine.

According to other aspects of the above system, the monitoring period duration may be a value programmed into the controller.

The controller may respond to a mode selector indicating that the system is in a high capacity mode by initiating the energy integrator system, resetting the monitoring period timer to zero, and resetting the energy integrator accumulated data to zero.

The controller may respond to a mode selector indicating that the system is in a low capacity mode by disabling the energy integrator system. The energy integrator system may monitor the energy across a transfer clutch based on slippage of the torque transfer clutch and provide cycle data.

The energy transferred across may be accumulated by the controller over the monitoring period.

The powertrain torque dependent transfer point learn routine may be deferred, based upon a powertrain torque measuring system that provides powertrain torque data that is compared to a powertrain torque threshold value, if the powertrain torque data is less than the powertrain torque threshold value.

The non-powertrain torque dependent transfer point learn routine is initiated immediately.

During a transfer point learn routine the clutch cycle data may not be accumulated by the system.

The controller may respond to a vehicle speed monitoring system that provides vehicle speed data by comparing the vehicle speed data to a threshold vehicle speed value and by not accumulating clutch cycle data if the vehicle speed data is less than the threshold vehicle speed.

In the third case, after the transfer point learn routine is triggered and a cool down delay timer threshold has not been reached, the controller increments the delay timer and clutch cycle data is not accumulated until the cool down delay timer reaches the threshold.

According to another aspect of this disclosure, a method is disclosed for controlling a torque transfer clutch of a four wheel drive vehicle that may include the following steps. A first data input source is monitored that indicates if the torque transfer clutch is in a four wheel drive mode. An energy integrator system monitors the energy across a transfer clutch and provides energy accumulator cycle data. A clutch temperature data source provides torque transfer clutch temperature data. A controller accumulates energy accumulator cycle data in a controller and provides accumulated energy data. In a first case, during a monitoring period the accumulated data is compared to a maximum accumulated energy value and if the maximum accumulated energy value is exceeded, the controller initiates a powertrain torque dependent transfer point learn routine. In a second case, the controller compares energy accumulator cycle data to a maximum cycle data value which, if exceeded, causes the controller to initiate a non-powertrain torque dependent transfer point learn routine. In a third case, temperature sensor data is compared to a maximum temperature value which, if exceeded, causes the controller to initiate a non-powertrain torque dependent transfer point learn routine.

According to other aspects of the above method, the method for controlling a torque transfer clutch of a four wheel drive vehicle may further comprise responding in the controller to a mode selector indicating that the system is in a high capacity mode by initiating the energy integrator system, resetting the monitoring period timer to zero, and resetting the energy integrator accumulated data to zero.

The method for controlling a torque transfer clutch of a four wheel drive vehicle may further comprise monitoring the energy across a transfer clutch based on the slippage of the torque transfer clutch with the energy integrator system, wherein the energy integrator system provides the cycle data.

The method for controlling a torque transfer clutch of a four wheel drive vehicle may further comprise accumulating the clutch cycle data by the controller over the monitoring period.

The method for controlling a torque transfer clutch of a four wheel drive vehicle may further comprise deferring initiating the powertrain torque dependent transfer point learn routine, based upon a powertrain torque measuring system that provides powertrain torque data that is compared to a powertrain torque threshold value, if the powertrain torque data is less than the powertrain torque threshold value.

The method for controlling a torque transfer clutch of a four wheel drive vehicle may further comprise initiating the non-powertrain torque dependent transfer point learn routine immediately.

The method for controlling a torque transfer clutch of a four wheel drive vehicle wherein during a transfer point learn routine the clutch cycle data is not accumulated.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
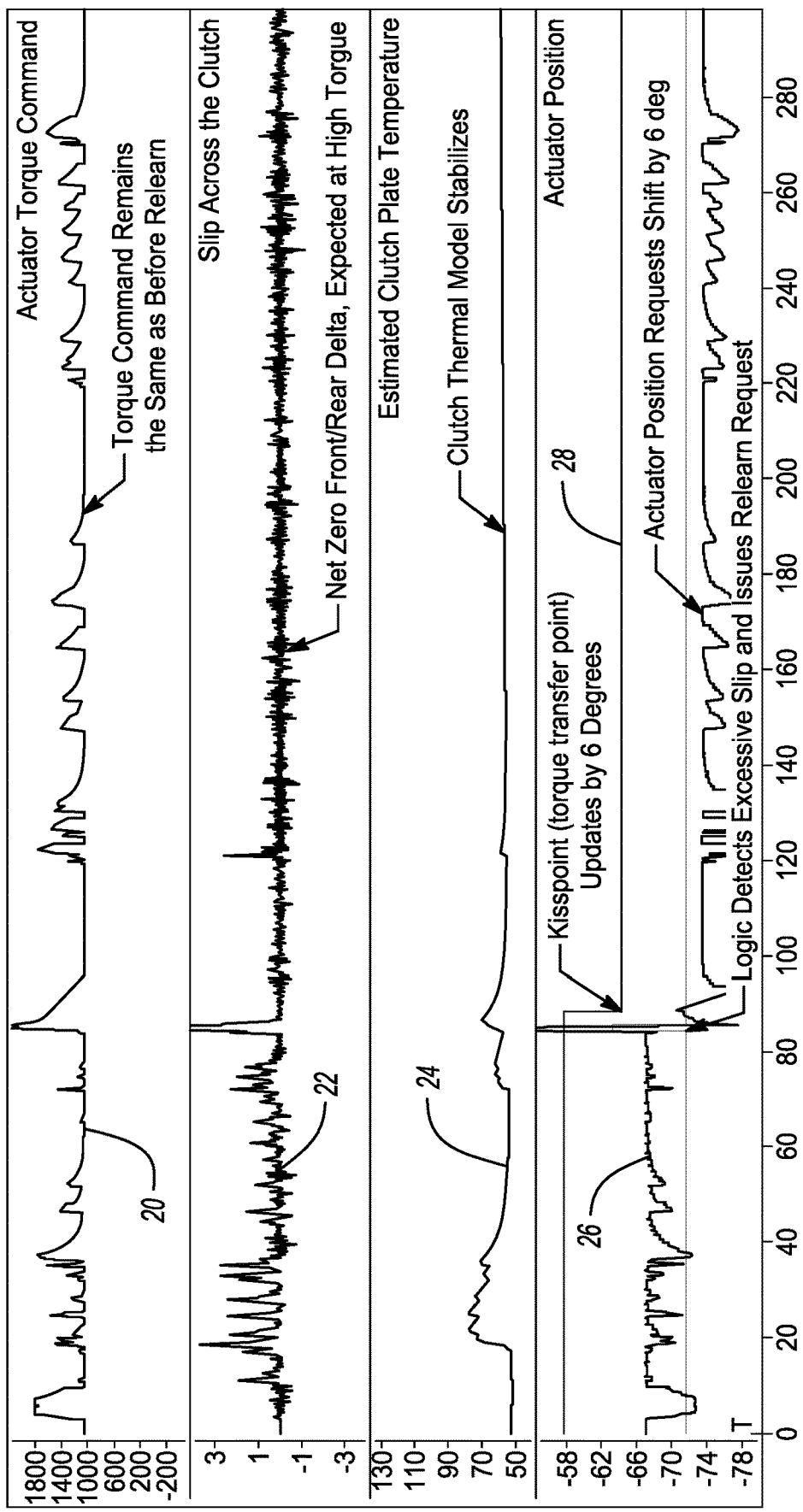
FIG. 1 is a graph of actuator torque command, handling in terms of slip across the torque transfer clutch, estimated clutch plate temperature, and actuator position.

Referring to FIG. 1, a graph of an example of a transfer case clutch operation is provided that compares traction in terms of actuator torque command on line 20, handling in terms of slip across the torque transfer clutch on line 22, clutch plate temperature data on line 24, and actuator position on line 26.

During the first 85 seconds, the system is shown in operation without the control logic for adjusting the transfer clutch torque transfer home position disclosed in this application. In the four wheel drive high mode shown on line 20, an error in the transfer clutch torque transfer home position of the clutch actuator when high torque commands are made may lead to slippage in the transfer case clutch and excessive clutch plate temperature and protective disabling of the transfer clutch. Without the control logic disclosed below, there is no way to correct the transfer clutch torque transfer home position that is learned once per ignition cycle.

Slippage across the transfer case clutch is shown on line 22 begins after the high torque command shown on line 20 begins at 10 seconds and peaks at about 20 seconds and continues to occur thereafter even during periods of reduced torque command.

The clutch plate temperature data is shown on line 24 to increase substantially at the time the slip response temperature increases and remains at an elevated level while the frequent significant slippage occurs in the transfer case clutch.

Line 26 shows the control logic detecting excessive slip and initiating a kisspoint relearn routine and adjusts the kisspoint by 6 degrees. The actuator position shown on line 28 drops a few seconds later and the control logic does not thereafter detect excessive slip in the transfer clutch.

The clutch plate temperature increases prior to the torque transfer point adjustment made by the disclosed method at about 85 seconds. The control logic detects excessive slippage and initiates a torque transfer point relearn request. The control logic updates the torque transfer point (e.g. by 6 degrees) at about 85 seconds as shown by line 26.

The clutch plate temperature shown on line 24 stabilizes after the first adjustment of the torque transfer home position.

Figure 2:
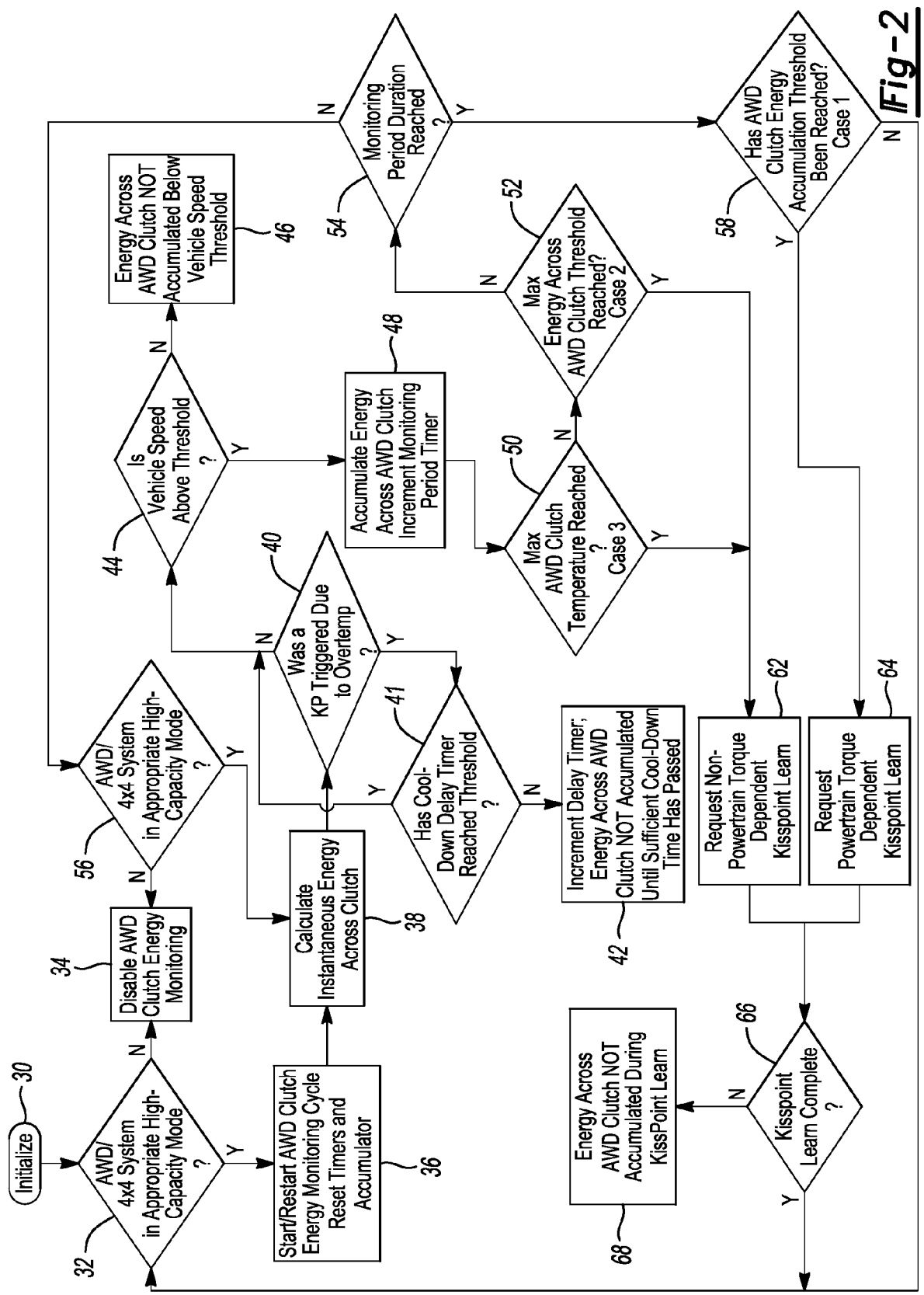
FIG. 2 is a flowchart of the method of controlling transfer clutch slippage and thermal protection actions by relearning the torque transfer point.

Referring to FIG. 2, a simplified version of the control logic is illustrated with a flowchart and is initialized at the block 30. An initial determination is made at 32 as to whether the all-wheel drive (AWD) or four wheel drive (4×4) system is in a high-capacity mode. If not, AWD energy monitoring is disabled at 34. If so, a clutch energy monitoring cycle is started or restarted and the timers and accumulator energy calculation are reset.

The calculated energy across the clutch is integrated at 38. The accumulator energy calculation is based upon a front to rear axle speed delta that is converted to radians/second delta across the transfer case clutch. The radians/second delta is converted to energy units using wheel torque and the time step. The total integrated energy across the clutch is converted to a scaler based on a histogram with calibratable bands after each calibrated period. The scaler can be either positive or negative.

If a torque transfer point, or kisspoint (KP) relearn, was not previously triggered due to a maximum temperature threshold being exceeded at 40 and the cool down delay timer reached its threshold, at 41, the control logic at 44 determines if the vehicle speed is above a threshold. If the cool down delay timer has not reached its threshold, at 41, the control logic at 42 will increment the delay timer, and the energy across the transfer case clutch will not be accumulated until sufficient cool down time has passed.

If the KP relearn was not triggered due to the transfer clutch being over temperature at 40, the control logic determines if the vehicle speed is above the threshold at 44. If not, the energy across the clutch is not accumulated at 46. If so, the energy across the clutch is accumulated and the monitor period timer is incremented at 48. Stated another way, if the vehicle speed drops below the calibratable threshold at 44 during an evaluation period, the energy integration will be paused at 46, and the running counter will not be reset. If so, energy is accumulated across the AWD clutch to provide energy accumulator cycle data and the monitor period timer is incremented, at 48.

It is determined if the maximum clutch temperature was reached at 50. If not, it is determined if the maximum energy across the clutch threshold was reached at 52. If the maximum clutch temperature was reached, the controller is requested, according to case 3, to initiate a non-powertrain torque dependent kisspoint learn at 62. In case 3, at 50, if the modeled clutch temperature reached the critical threshold temperature during any evaluation period, temperature data is provided and the control logic will immediately indicate the need to perform a clutch torque transfer point relearn procedure, regardless of the total integrated energy or the running counter value.

If at 52 the maximum energy across the clutch threshold was reached, the controller is requested, according to case 2, to initiate a non-powertrain torque dependent kisspoint learn at 62. If at 52 the maximum energy across the clutch threshold was not reached, it is determined at 54 if the monitoring period duration was reached. If the monitoring period duration has not been reached, it is determined if the system is in the high capacity mode at 56. If the system is not in the high capacity mode clutch energy monitoring is disabled at 34. If the system is in the high capacity mode, the system continues to calculate the instantaneous energy across the clutch at 38.

If at 54 the monitoring period duration has been reached, a determination is made at 58 as to whether the clutch energy accumulation threshold was reached, if so, according to Case 1, the controller is requested to initiate a powertrain torque dependent kisspoint learn at 64. In Case 1, the scaler is added to a running counter which over several integration periods reaches a maximum threshold and indicates the need to perform a clutch torque transfer point relearn procedure. If the clutch energy accumulation threshold has not been reached at 58, the controller returns to 32 and monitoring continues, and it is determined again as to whether the all-wheel drive (AWD) or four wheel drive (4×4) system is in a high-capacity mode.

In the event of a kisspoint learn is requested in either the non-powertrain dependent mode at 62 or the powertrain dependent mode at 64, the control logic makes a determination at 66 as to whether the kisspoint learn is complete. During a transfer point learn routine clutch cycle data is not accumulated. Once a clutch torque transfer point relearn has been initiated, the integrated energy scalar and the running counter will be reset to zero, and the energy integrator will not begin integrating again until the relearn process is complete. If so, the controller returns to 32 and monitoring continues, and it is determined again as to whether the all-wheel drive (AWD) or four wheel drive (4×4) system is in a high-capacity mode. If the kisspoint learn is not complete at 66, energy across the clutch is not accumulated during the kisspoint learn routine at 68.

For relearns due to Case 1, the logic also requires powertrain torque to be below a calibratable threshold before the routine is run at 64. If all of the conditions are met, a relearn request will be issued, and the control logic will request the torque transfer point relearn procedure and update the torque transfer point position value. While the transfer case controls are performing the torque transfer point relearn procedure, the logic will issue a powertrain torque limit request to the powertrain controls.

When relearning due to Case-2 or Case-3, the logic does not require powertrain torque to be below a calibratable threshold to issue the relearn request to the transfer case controls. In these cases, the logic will issue a powertrain torque reduction request to the powertrain controls. This reduction will be maintained while the transfer case controls are performing the torque transfer point relearn procedure.

An advantage of this new control logic is that it provides the opportunity to perform the torque transfer point relearn during a drive cycle before overheating occurs.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments. In addition, the features of various implementing embodiments may be combined to form further embodiments of the invention.

What is claimed is:

1. A system for controlling a torque transfer clutch of a four-wheel drive vehicle comprising:
   a first data input source that indicates if the torque transfer clutch is in a four-wheel drive mode;
   an energy integrator system that monitors energy transferred across a transfer clutch;
   a temperature data source provides transfer clutch temperature data; and
   a controller programmed with an algorithm that controls the torque transfer clutch based in part on a transfer point value, wherein the algorithm:
      in a first case responds to energy integrator accumulated data as to the energy across the torque transfer clutch during a monitoring period and compares the energy accumulator accumulated data to a maximum accumulated energy value by initiating a powertrain torque dependent transfer point learn routine,
      in a second case responds to energy accumulator cycle data as to the energy across the torque transfer clutch in a single monitoring cycle and compares the energy accumulator cycle data to a maximum cycle data value by initiating a non-powertrain torque dependent transfer point learn routine,
      in a third case responds to clutch temperature data and compares the clutch temperature data to a maximum temperature value by initiating the non-powertrain torque dependent transfer point learn routine;
   wherein the controller, responsive to one of the above transfer point learn routines, revises the transfer point value to a revised transfer point value, wherein the controller controls the torque transfer clutch based upon the revised transfer point value.

2. The system of claim 1 wherein a monitoring period duration is a value programmed into the controller.

3. The system of claim 1 wherein the controller responds to a mode selector indicating that the system is in a high-capacity mode by initiating the energy integrator system, resetting a monitoring period timer to zero, and resetting the energy integrator accumulated data to zero.

4. The system of claim 1 wherein the controller responds to a mode selector indicating that the system is in a low-capacity mode by disabling the energy integrator system.

5. The system of claim 1 wherein the energy integrator system monitors the energy across a transfer clutch based on slippage of the torque transfer clutch and provides cycle data.

6. The system of claim 5 wherein the energy transferred across the transfer clutch is accumulated by the controller over the monitoring period.

7. The system of claim 1 further comprising:
   a powertrain torque measuring system that provides powertrain torque data that is compared to a powertrain torque threshold value, wherein the powertrain torque dependent transfer point learn routine is deferred if the powertrain torque data is less than the powertrain torque threshold value.

8. The system of claim 1 wherein the non-powertrain torque dependent transfer point learn routine is initiated immediately.

9. The system of claim 1 wherein during a transfer point learn routine, clutch cycle data is not accumulated.

10. The system of claim 1 further comprising:
a vehicle speed monitoring system that provides vehicle speed data to the controller and compares the vehicle speed data to a threshold vehicle speed value, wherein clutch cycle data is not accumulated if the vehicle speed data is less than the threshold vehicle speed value.

11. The system of claim 1 further comprising:
a cool down delay timer that is incremented in the third case after the transfer point learn routine is triggered, wherein the cool down delay timer time value is compared to a cool down threshold time value and if the cool down threshold time value has not been reached, the controller increments the cool down delay timer and clutch cycle data is not accumulated until the cool down delay timer time value reaches the cool down threshold time value.

12. A method for controlling a torque transfer clutch of a four-wheel drive vehicle comprising:
monitoring a first data input source that indicates if the torque transfer clutch is in a four-wheel drive mode;
monitoring an energy integrator system that monitors energy transferred across a transfer clutch and provides energy accumulator cycle data;
monitoring a temperature data source that measures a torque transfer clutch temperature and provides clutch temperature data;
accumulating energy accumulator cycle data provided to a controller programmed with an algorithm that controls the torque transfer clutch based in part on a transfer point value, wherein the algorithm;
comparing in the controller in a first case during a monitoring period energy accumulator cycle data to a maximum accumulated energy value and requesting a powertrain torque dependent transfer point learn routine if the energy accumulator cycle data is greater than the maximum accumulated energy value;
comparing in the controller in a second case energy accumulator cycle data to a maximum energy accumulator cycle data value by requesting a non-powertrain torque dependent transfer point learn routine if the energy accumulator cycle data is greater than the maximum energy accumulator cycle data value; and
comparing in the controller in a third case clutch temperature data to a maximum clutch temperature value and initiating a non-powertrain torque dependent transfer point learn routine if the clutch temperature data is greater than the maximum clutch temperature value;
wherein the controller, responsive to one of the above transfer point learn routines, revises the transfer point value to a revised transfer point value, and wherein the controller controls the torque transfer clutch based upon the revised transfer point value.

13. The method of claim 12 further comprising:
responding in the controller to a mode selector indicating that the torque transfer clutch is in a high capacity mode by initiating the energy integrator system, resetting a monitoring period timer to zero, and resetting energy integrator accumulated data to zero.

14. The method of claim 12 further comprising:
monitoring the energy across a transfer clutch based on slippage of the torque transfer clutch by the energy integrator system, wherein the energy integrator system provides the energy accumulator cycle data.

15. The method of claim 14 further comprising:
accumulating the energy accumulator cycle data by the controller over a monitoring period.

16. The method of claim 12 further comprising:
deferring initiating the powertrain torque dependent transfer point learn routine, based upon a powertrain torque measuring system that provides powertrain torque data that is compared to a powertrain torque threshold value, if the powertrain torque data is less than the powertrain torque threshold value.

17. The method of claim 12 further comprising:
deferring initiating the powertrain torque dependent transfer point learn routine, based upon a powertrain torque measuring system that provides powertrain torque data that is compared to a powertrain torque threshold value, if the powertrain torque data is less than the powertrain torque threshold value.

18. The method of claim 12 further comprising:
initiating the non-powertrain torque dependent transfer point learn routine immediately.

19. The method of claim 12 wherein during a transfer point learn routine the energy accumulator cycle data is not accumulated.

20. A system for controlling a torque transfer clutch of a four-wheel drive vehicle comprising:
an energy integrator system that monitors the energy transferred across a transfer clutch, wherein the energy integrator system monitors the energy across a transfer clutch based on slippage of the torque transfer clutch and provides cycle data;
a temperature data source provides transfer clutch temperature data; and
a controller programmed with an algorithm that controls the torque transfer clutch based in part on a transfer point value, wherein the energy transferred across the transfer clutch is accumulated by the controller over the monitoring period:
in a first case responds to energy integrator accumulated data as to the energy across the torque transfer clutch during a monitoring period and compares the accumulated data to a maximum accumulated energy value by initiating a powertrain torque dependent transfer point learn routine,
in a second case responds to energy accumulator cycle data as to the energy across the torque transfer clutch in a single monitoring cycle and compares the cycle data to a maximum cycle data value by initiating a non-powertrain torque dependent transfer point learn routine,
in a third case responds to clutch temperature data and compares the clutch temperature data to a maximum temperature value by initiating the non-powertrain torque dependent transfer point learn routine
wherein the controller, responsive to one of the above transfer point learn routines, revises the transfer point value to a revised transfer point value, and wherein the controller controls the torque transfer clutch based upon the revised transfer point value.

* * * * *